（12） United States Patent
Wakabayashi

(10) Patent No.: US 6,259,660 B1
(45) Date of Patent: Jul. 10, 2001

(54) OPTICAL DISK APPARATUS HAVING ERROR CORRECTION CIRCUIT

(75) Inventor: Haruo Wakabayashi, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/298,857

(22) Filed: Apr. 26, 1999

(30) Foreign Application Priority Data

Apr. 27, 1998 (JP) .................................................. 10-116728

(51) Int. Cl.⁷ ..................................................... G11B 5/09
(52) U.S. Cl. ................................. 369/47.18; 369/53.32; 369/59.26
(58) Field of Search .................................. 369/47, 48, 54, 369/59; 360/51; 375/368, 367, 106, 112; 371/37.11, 37.5, 37.8, 39.1, 40.1, 40.3

(56) References Cited

U.S. PATENT DOCUMENTS

| Re. 33,665 | * | 8/1991 | Ogawa | 369/47.28 |
| 4,727,530 | * | 2/1988 | Tomisawa | 309/47.45 |
| 5,051,998 | * | 9/1991 | Murai et al. | 371/39.1 |
| 5,677,935 | * | 10/1997 | Karino | 375/368 |
| 6,130,866 | * | 10/2000 | Shigenohu et al. | 369/47.18 |

FOREIGN PATENT DOCUMENTS

| 62-262274 | * | 11/1987 | (JP) . |
| 8-289249 | | 11/1996 | (JP) . |
| 10-27428 | | 1/1998 | (JP) . |
| 10-31864 | | 2/1998 | (JP) . |

* cited by examiner

Primary Examiner—Thang V. Tran
(74) Attorney, Agent, or Firm—Oblon, Spivak, McClelland, Maier & Neustadt, P.C.

(57) ABSTRACT

A frame number correction signal generating circuit generates a control signal for correcting a frame number counter in the unit of two frames based on an out-of-sync. signal output from an out-of-sync. detection circuit and the least significant bit of a frame number output from a frame number detection circuit. The frame number counter corrects the frame number in the unit of two frames according to a control signal supplied from the frame number correction signal generating circuit. Therefore, the continuity of two frames constituting one row of ECC block can be maintained and a lowering in the correction ability of the error correction circuit can be prevented.

20 Claims, 6 Drawing Sheets

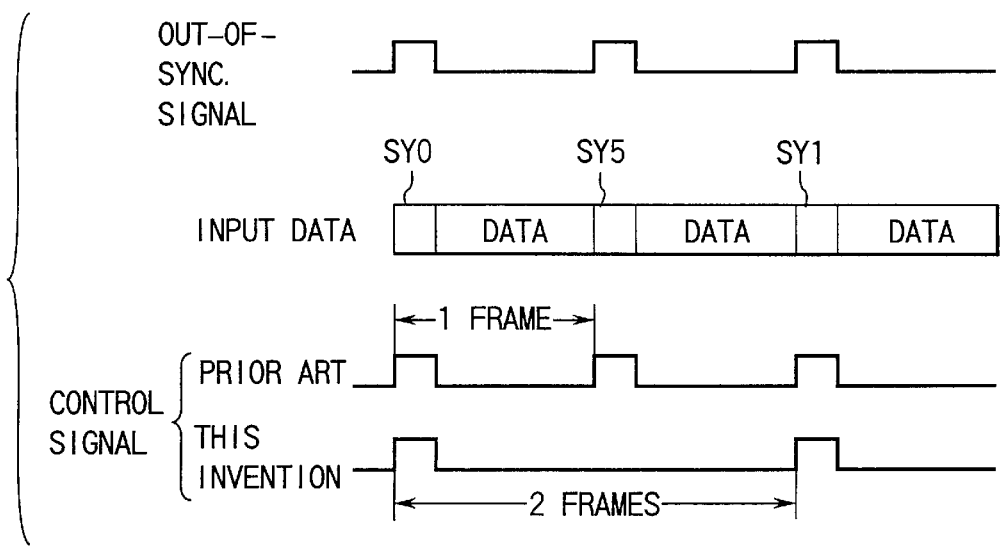
FIG. 2
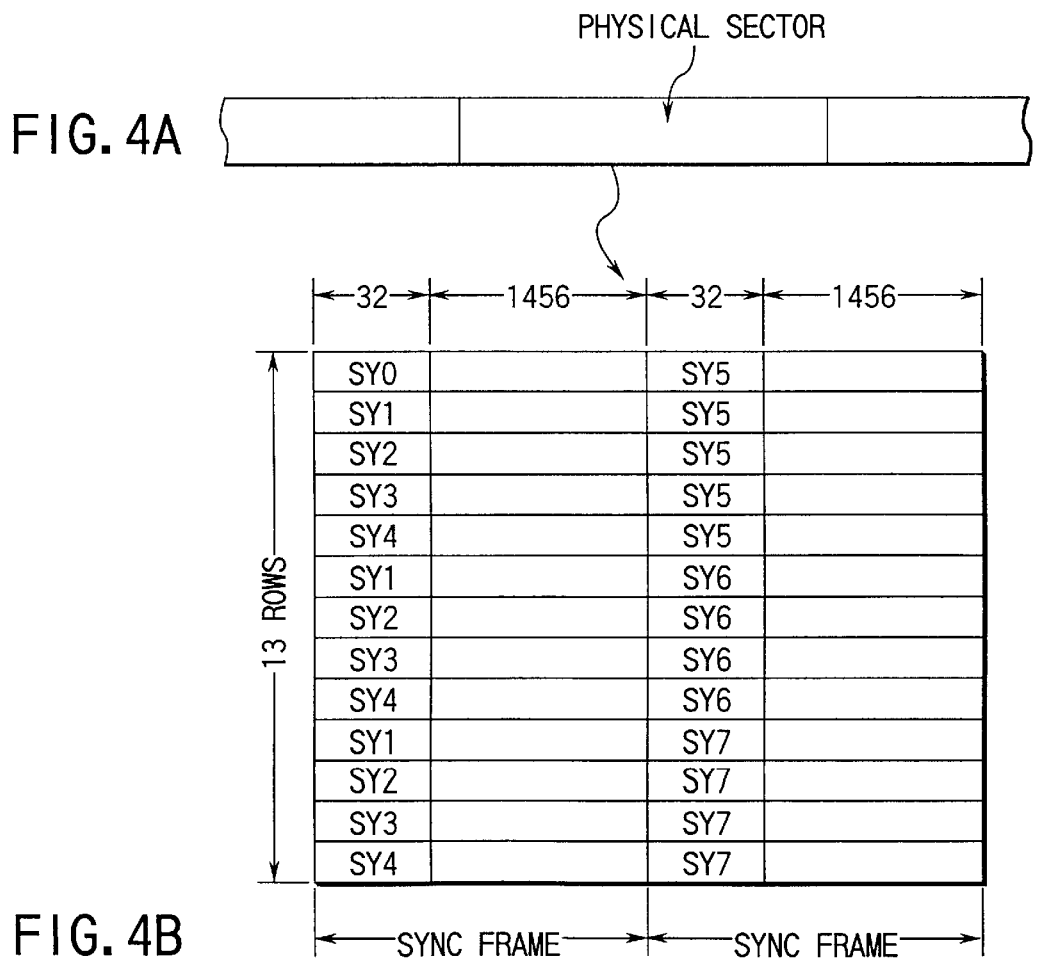
FIG. 4A
FIG. 4B

OPTICAL DISK APPARATUS HAVING ERROR CORRECTION CIRCUIT

BACKGROUND OF THE INVENTION

This invention relates to an optical disk apparatus for reproducing data recorded on an optical disk such as a DVD (Digital Versatile Disk) or DVDVRAM or recording data thereon.

Recently, DVDs or DVDRAMs have been developed as an optical recording medium of large capacity. This type of optical disk can be used to record a large amount of data with high density and correctly reproduce recorded data. To serve the purpose, record data and an error correction code used for correcting an error of the recorded data are recorded on the optical disk.

A method for recording data on this type of optical disk is explained with reference to FIGS. 3A to 3D. As is clearly seen from FIG. 3B showing the enlarged recording surface of part of an optical disk 10 shown in FIG. 3A, a plurality of pits 11 are formed. Sets of the pits 11 constitute sectors as shown in FIGS. 3C, 3D. For example, a track (not shown) is formed in a spiral form from the center towards the periphery on the surface of the optical disk 10 and a sector string formed of a plurality of sectors is formed on the track. The sector string is continuously read by an optical head and recorded data is reproduced on the real time basis.

FIGS. 4A, 4B show a sector in which data is recorded. One sector is constructed by 13 rows×2 frames and sync. codes SY0, . . . , SY7 are attached to the frames. The sync. code is used to define a reference timing of a serial/parallel conversion circuit which will be described later. In FIG. 4B, the frame arrangement is shown in a 2-dimensional form, but the frames are recorded in order on the track starting from the top frame. That is, if the frames are shown in an order of the sync. codes, the frames are arranged on the track in an order of SY0, ST5, SY1, SY5, SY2, SY5, . . . . The order of each frame can be recognized from the relation between the two continuous sync. codes. The number of bits of the sync. codes constituting one frame is 32 bits (=16 bits×2) and the number of bits of data is 1456 bits (=16 bits×91). The equations in the parentheses indicate that the sync. code and data are 16-bit modulation codes. That is, when data is recorded on the optical disk, 8-bit data is modulated into 16-bit data.

FIG. 5A shows one decoded sector. In the recording sector, 16-bit data in the above sector is decoded into 8 bits. The data amount in the recording sector is (172+10) bytes× (12+1) rows. In each row, a 10-byte error correction code is added. Further, an error correction code of one row is present in the sector and the error correction code functions as an error correction code for the column direction when 12 rows are obtained as will be described later.

FIG. 5B shows a data block in which the error correction code is removed from the data of one sector shown in FIG. 5A. The data block has a sector ID (4 bytes) for identifying a sector, an ID error detection code IED (2 bytes) for detecting an error of the sector ID and copyright management information CPR-MAI (6 bytes) which are attached to the head portion of 2048-byte main data and an error detection code EDC (4 bytes) attached to the end portion of the data.

Next, the error correction code block (ECC block) is explained.

The ECC block shown in FIGS. 6, 7 is constructed by 16 sectors having the same construction as described above. However, the sync. code is eliminated. As shown in FIG. 6, a 16-byte outer parity (PO) is attached to each column and a 10-byte inner parity (PI) is attached to each row. The outer parity (PO) is error correction data of 172 columns and the inner parity (PI) is error correction data of (192+16) rows. As shown in FIG. 7, at the time of recording, the outer parity (PO) of 16 rows shown in FIG. 6 is arranged in a distributed manner in one sector for each row. As a result, one recording sector is constructed as data of 13 (=12+1) rows. In FIG. 6, B0, 0, B0, 1, . . . each indicate an address of byte unit. Further, in FIG. 7, numerals 0 to 15 attached to the sectors indicate the numbers of the recording sectors.

FIG. 8 shows the relation between one row of the ECC block shown in FIG. 6 and the frames included in the sector. The ECC block of one row (172 bytes+10 bytes=182 bytes) corresponds to two frames (1456 bits+1456 bits=91 bytes+ 91 bytes=182 bytes) obtained by eliminating the sync. code in the sector.

FIG. 9 shows a disk apparatus related to this invention. A disk motor 201 drives and rotates an optical disk 202. An optical head, for example, a laser pickup 203 applies a beam to the pit string on the optical disk 202 to detect the reflected beam by use of a built-in photodiode (not shown) or the like and convert the detected beam into an electrical signal (high-frequency signal: RF signal). An RF amplifier 204 amplifies an RF signal output from the laser pickup 203 and subjects the amplified RF signal to the waveform equalization process. Further, the RF amplifier 204 creates and outputs a focus error signal 205 and tracking error signal 206. A servo control circuit 207 compensates for the gains and phases of the focus error signal 205 and tracking error signal 206 output from the RF amplifier 204 to drive an actuator (not shown) in the laser pickup 203. Thus, the stable focus servo and tracking servo can be effected.

A slicer 208 binary-codes an RF signal output from the RF amplifier 204 into a 1-bit digital signal. A data PLL (Phase Locked Loop) circuit 209 reproduces a bit clock signal 210 in synchronism with the RF signal supplied from the slicer 208. A serial/parallel (S/P: Serial/Parallel) conversion circuit 211 serial/parallel-converts the 1-bit RF signal supplied from the slicer 208 in the unit of 16 bits. As described before, the S/P conversion timing signal is created based on the sync. code in the DVD signal. That is, a sync. code detection circuit 212 detects a sync. code (SY0 to SY7) shown in FIG. 4B from the binary-coded RF signal supplied from the slicer 208. A frame counter 213 counts (32+1456) bits in one frame in synchronism with the sync. code supplied from the sync. code detection circuit 212. A timing signal generating circuit 214 generates a timing signal for the S/P conversion circuit 211 or the like based on the count of the frame counter 213. An 8/16 demodulation circuit 215 converts a 16-bit code supplied from the S/P conversion circuit 211 into 8-bit data. The converting operation is effected according to conversion data stored in a ROM 216.

A frame number detection circuit 217 fetches sync. codes of several frames supplied from the sync. code detection circuit 212 and detects the present frame number based on the relation between the preceding and succeeding sync. codes. A frame number counter 219 loads and corrects the frame number supplied from the frame number detection circuit 217.

An ID detection circuit 220 detects an sector ID provided in the sector unit shown in FIG. 5B. An address generating circuit 221 generates an address used when data output from the 8/16 demodulation circuit 215 is written into a RAM 222 based on the output signal of the frame number counter 219 and the output signal of the ID detection circuit 220. The 8-bit data output from the ⅜₁₆ demodulation circuit 215 is supplied to the RAM 222 via a data bus 223 and written into an area corresponding to the address generated from the address generating circuit 221.

An error correction circuit 224 corrects data stored into the RAM 222 in the unit of inner parity PI and outer parity PO shown in FIG. 6. A CPU 225 controls the operation of the whole portion of the optical disk apparatus. An input/output I/F (Inter Face) circuit 226 controls the input/output of data between the RAM 222 and an external device (not shown).

As described before, the sync. codes attached to the frames of the sector are periodically arranged and the order of the frames can be recognized according to the order of the sync. codes. Therefore, if the periodicity of the sync. codes is disturbed, data processed in the S/P conversion circuit 211 and the frame number now counted by the frame number counter 219 become different from each other and the address of the RAM in which data is finally written becomes different. In order to prevent the problem, for example, an out-of-sync. detection circuit 230 detects the out-of-sync. state based on the periodicity of the sync. codes supplied from the sync. code detection circuit 212 and outputs an out-of-sync. signal if the periodicity of the sync. codes is disturbed. The out-of-sync. detecting operation is effected in the unit of one frame, and if the synchronization is not obtained, an out-of-sync. signal is output in the unit of one frame. The out-of-sync. signal is supplied to the frame number counter 219 as a control signal for correcting the frame number counter 219. The frame number counter 219 fetches a frame number from the frame number detection circuit 217 according to the supplied control signal and corrects the frame number.

As is explained with reference to FIG. 8, one row including the inner parity PI of the ECC block is constructed by data of two frames except the sync. code of the sector in the physical sector shown in FIG. 4B. However, the control signal for counter correction from the out-of-sync. detection circuit 230 shown in FIG. 9 is output in the unit of one frame and the frame number counter 219 corrects the frame number in the unit of one frame. For this reason, if the continuity between the two frames constituting one row of the ECC block is disturbed, there occurs a possibility that one row is constructed by two frames having no relation with each other from the viewpoint of data correction. Thus, the correction ability of the error correction circuit 224 is lowered if the continuity between the two frames constituting one row of the ECC block is disturbed.

BRIEF SUMMARY OF THE INVENTION

This invention is made in order to solve the above problem and an object of this invention is to provide an optical disk apparatus capable of preventing a lowering in the error correction ability.

The above object can be attained by an optical signal processing circuit comprising a sync. code detection circuit for detecting sync. codes included in a recording sector of an optical disk, the sector including a plurality of frames and each of the frames including a sync. code and data; a frame number detection circuit for detecting a frame number of the frame based on the sync. code output from the sync. code detection circuit; a frame number counter for counting the frame number output from the frame number detection circuit; an out-of-sync. detection circuit for detecting the periodicity of the sync. codes output from the sync. code detection circuit and outputting an out-of-sync. signal when the periodicity is disturbed; and a frame number correction signal generating circuit for generating a control signal for correcting the frame number of the frame number counter in the error correction unit based on the out-of-sync. signal output from the out-of-sync. detection circuit and an output signal of the frame number detection circuit and supplying the control signal to the frame number counter.

The above object can be attained by an optical disk apparatus comprising a reading circuit for reading a sync. code and data recorded in each sector of an optical disk; a sync. code detection circuit for detecting the sync. code read by the reading circuit; a frame number detection circuit for detecting a frame number of the frame included in the sector based on a plurality of sync. codes output from the sync. code detection circuit; a frame number counter for counting the frame number according to an output signal of the frame number detection circuit; an out-of-sync. detection circuit connected to the sync. code detection circuit, the out-of-sync. detection circuit outputting an out-of-sync. signal when the periodicity of the sync. codes output from the sync. code detection circuit is disturbed; and a frame number correction signal generating circuit connected to the out-of-sync. detection circuit and frame number detection circuit, the frame number correction signal generating circuit generating a control signal for correcting the frame number of the frame number counter in the error correction unit based on the out-of-sync. signal output from the out-of-sync. detection circuit and the output signal of the frame number detection circuit and supplying the control signal to the frame number counter.

According to this invention, since the continuity of frames constructing the error correction unit can be maintained by correcting the frame number of the frame number counter in the error correction unit of the error correction circuit, a lowering in the correction ability of the error correction circuit can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a timing diagram showing the operation of FIG. 1;

FIG. 4A is a diagram showing a physical sector;

FIG. 4B is a diagram showing the construction of the physical sector;

DETAILED DESCRIPTION OF THE INVENTION

There will now be described an embodiment of this invention with reference to the accompanying drawings.

Figure 1:
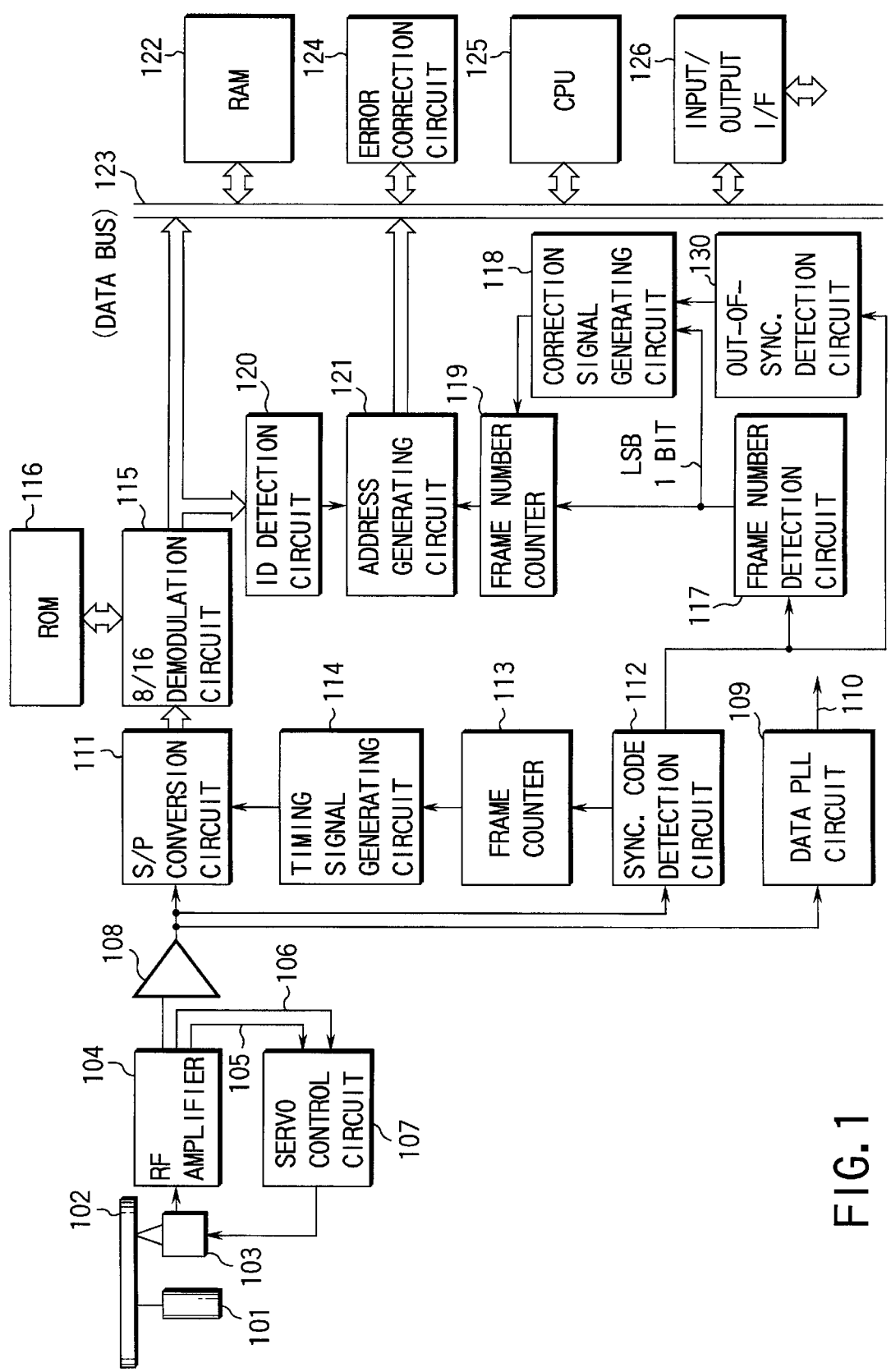
FIG. 1 is a construction diagram showing one embodiment of this invention.
Figure 3A:
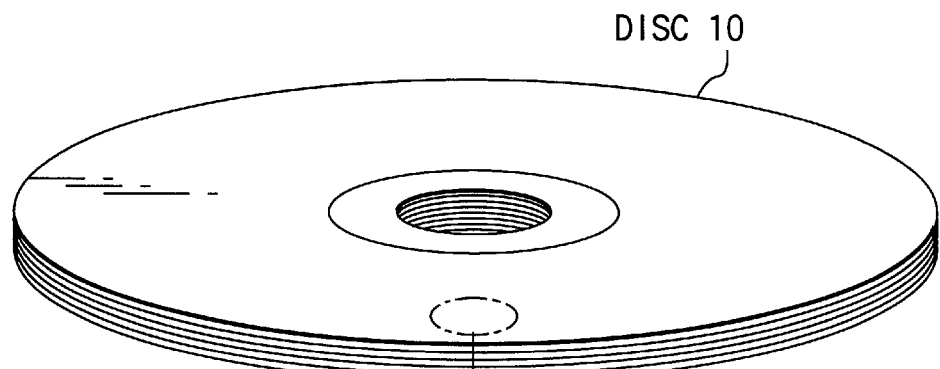
FIG. 3A is a perspective view showing an optical disk.
Figure 3B:
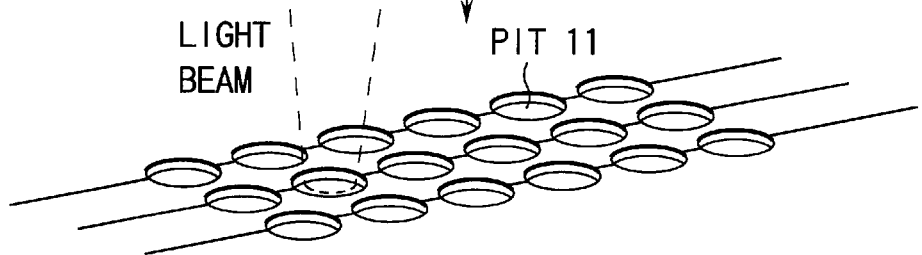
FIG. 3B is a perspective view showing a pit string of FIG. 3A.
Figure 3C:
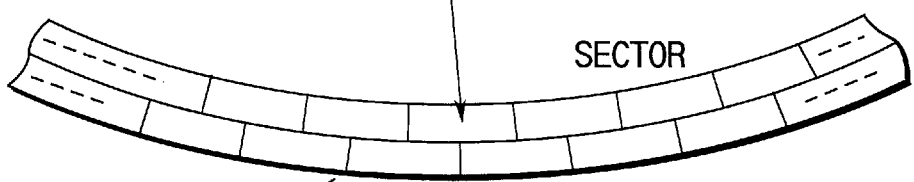
FIG. 3C is a view showing a sector string of FIG. 3A.
Figure 3D:
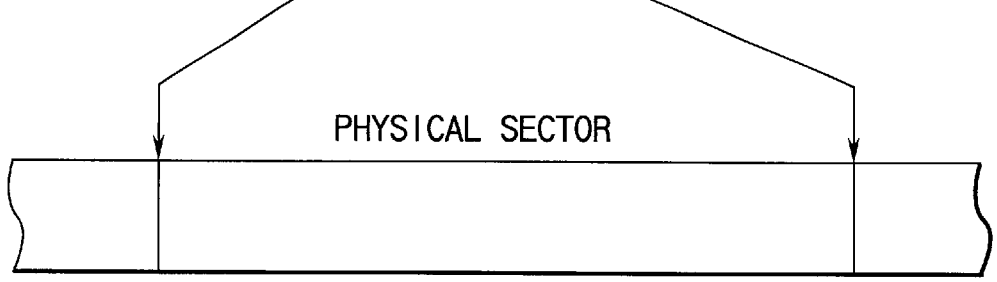
FIG. 3D is a view showing a physical sector of FIG. 3C.

FIG. 1 shows an optical disk apparatus of this invention. A disk motor 101 drives and rotates an optical disk 102. A laser pickup 103 used as an optical head, for example, reads a sync. code and data, both recorded in the each of the sectors of the optical disk, by applying a beam to a pit string on the optical disk 102. The pickup 103 thereby detects the reflected beam by use of a built-in photodiode (not shown) or the like and converts the detected beam into an RF signal. An RF amplifier 104 amplifies an RF signal output from the laser pickup 103 and subjects the amplified RF signal to the waveform equalization process. Further, the RF amplifier 104 creates and outputs a focus error signal 105 and tracking error signal 106. A servo control circuit 107 compensates for the gains and phases of the focus error signal 105 and tracking error signal 106 output from the RF amplifier 104 to drive an actuator (not shown) in the laser pickup 103. Thus, the stable focus servo and tracking servo can be effected.

A slicer 108 binary-codes an RF signal output from the RF amplifier 104 into a 1-bit digital signal. A data PLL circuit 109 reproduces a bit clock signal 110 in synchronism with the RF signal supplied from the slicer 108. A serial/parallel conversion circuit 111 serial/parallel-converts the 1-bit RF signal supplied from the slicer 108 in the unit of 16 bits. As described before, the S/P conversion timing signal is created based on the sync. code in the DVD signal.

A sync. code detection circuit 112 detects a sync. code (SY0 to SY7) shown in FIG. 4B from the binary-coded RF signal supplied from the slicer 108. A frame counter 113 counts (32+1456) bits in one frame in synchronism with the sync. code supplied from the sync. code detection circuit 112. A timing signal generating circuit 114 generates a timing signal for the S/P conversion circuit 111 or the like based on the count of the frame counter 113. An 8/16 demodulation circuit 115 converts a 16-bit code supplied from the S/P conversion circuit 111 into 8-bit data. The converting operation is effected according to conversion data stored in a ROM 116.

A frame number detection circuit 117 fetches sync. codes of several frames supplied from the sync. code detection circuit 112 and detects the present frame number based on the relation between the preceding and succeeding sync. codes. The frame number detection circuit 117 outputs the detected frame number. A frame number counter 119 loads and corrects the frame number supplied from the frame number detection circuit 117.

Figure 5A:
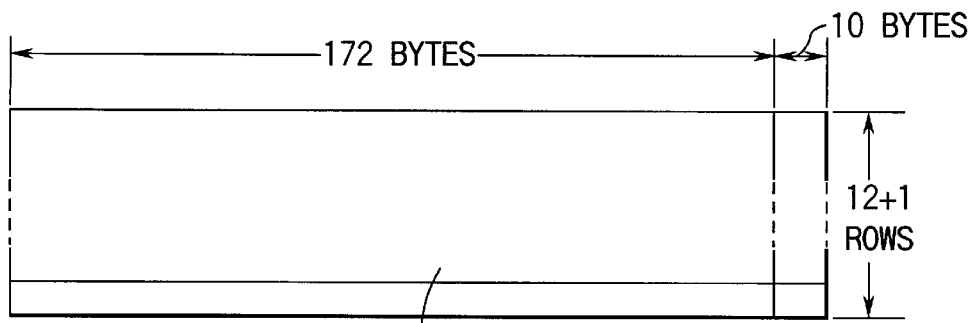
FIG. 5A is a diagram showing a physical sector.
Figure 5B:
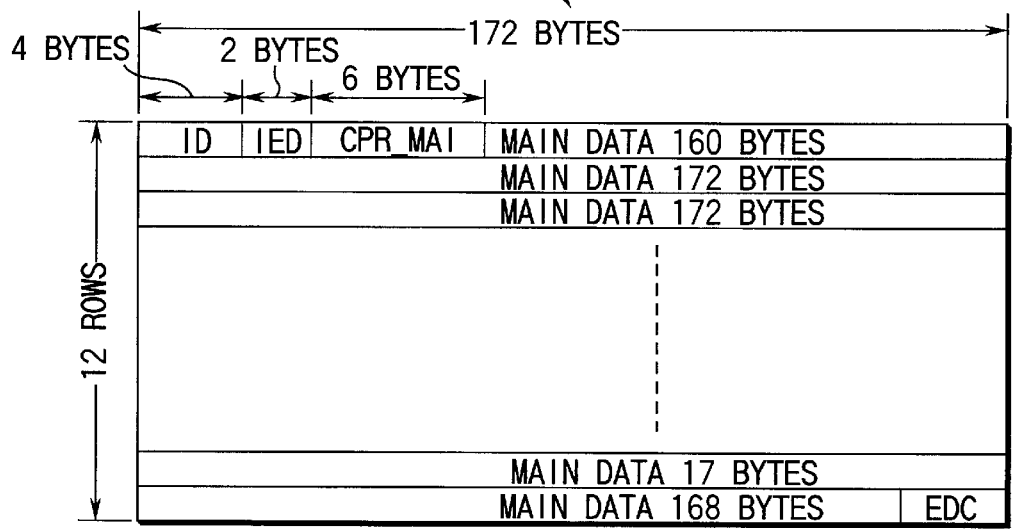
FIG. 5B is a diagram showing the construction of the physical sector.

An ID detection circuit 120 detects a sector ID provided in the physical sector unit shown in FIG. 5B. An address generating circuit 121 generates an address used when data output from the 8/16 demodulation circuit 115 is written into a RAM 122 based on the output signal of the frame number counter 119 and the output signal of the ID detection circuit 120. The 8-bit data output from the 8/16 demodulation circuit 115 is supplied to the RAM 122 via a data bus 123 and written into an area corresponding to the address generated from the address generating circuit 121.

Figure 6:
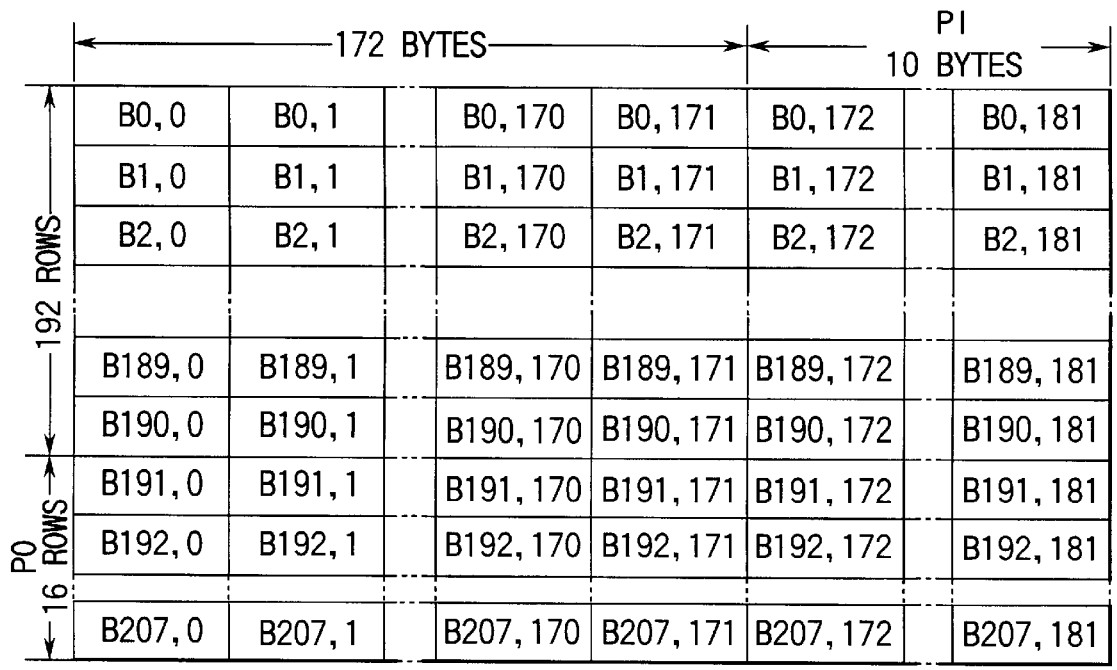
FIG. 6 is a diagram showing an ECC block.
Figure 7:
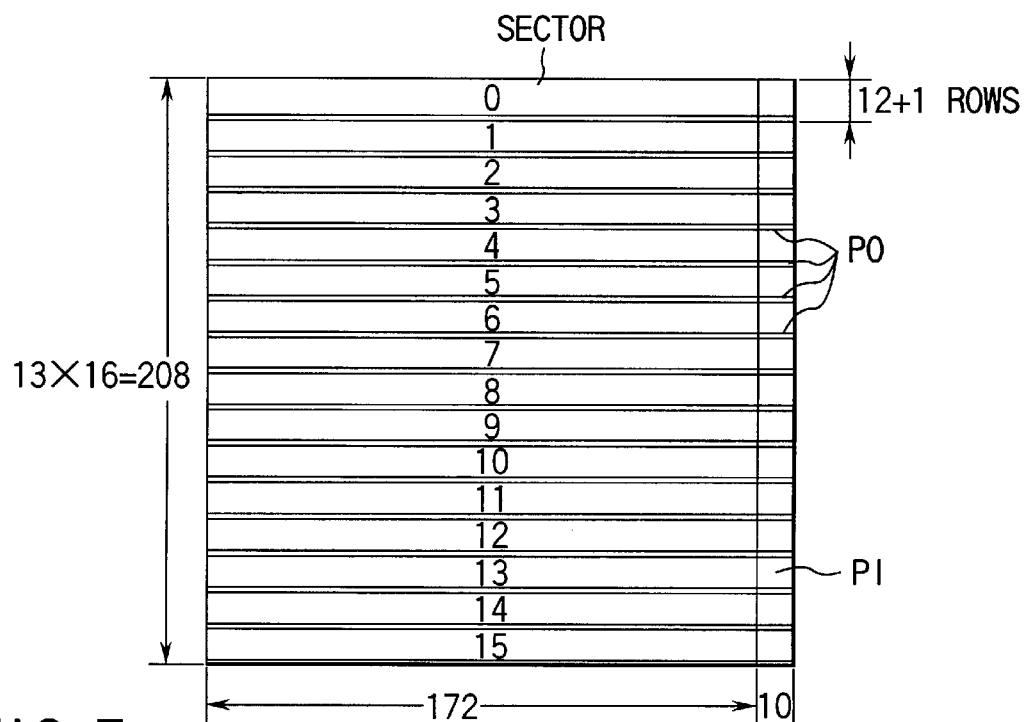
FIG. 7 is a diagram showing an ECC block.
Figure 8:
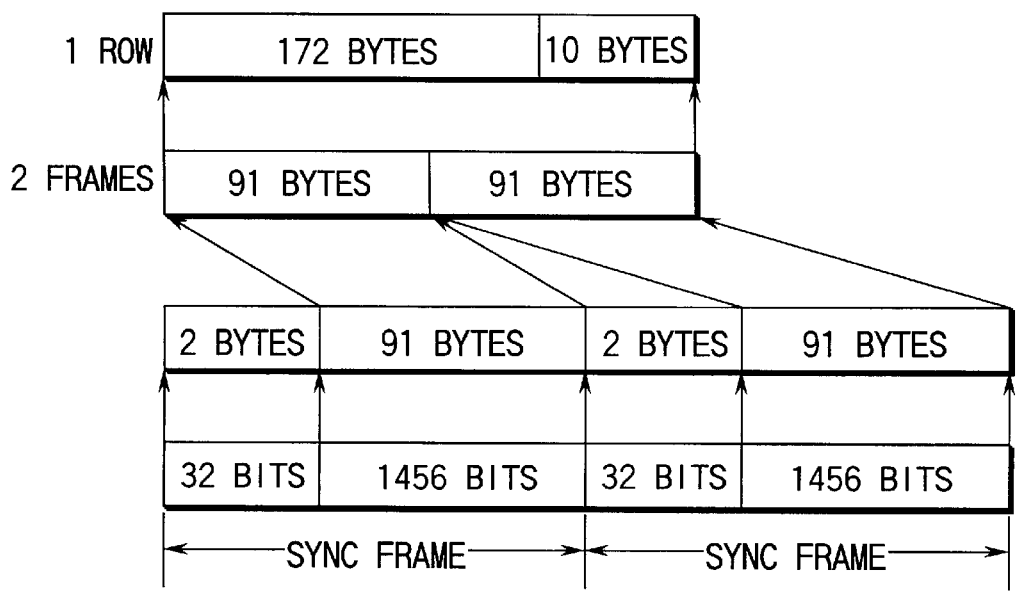
FIG. 8 is a diagram showing the relation between one row of the ECC block and the frame of the sector.
Figure 9:
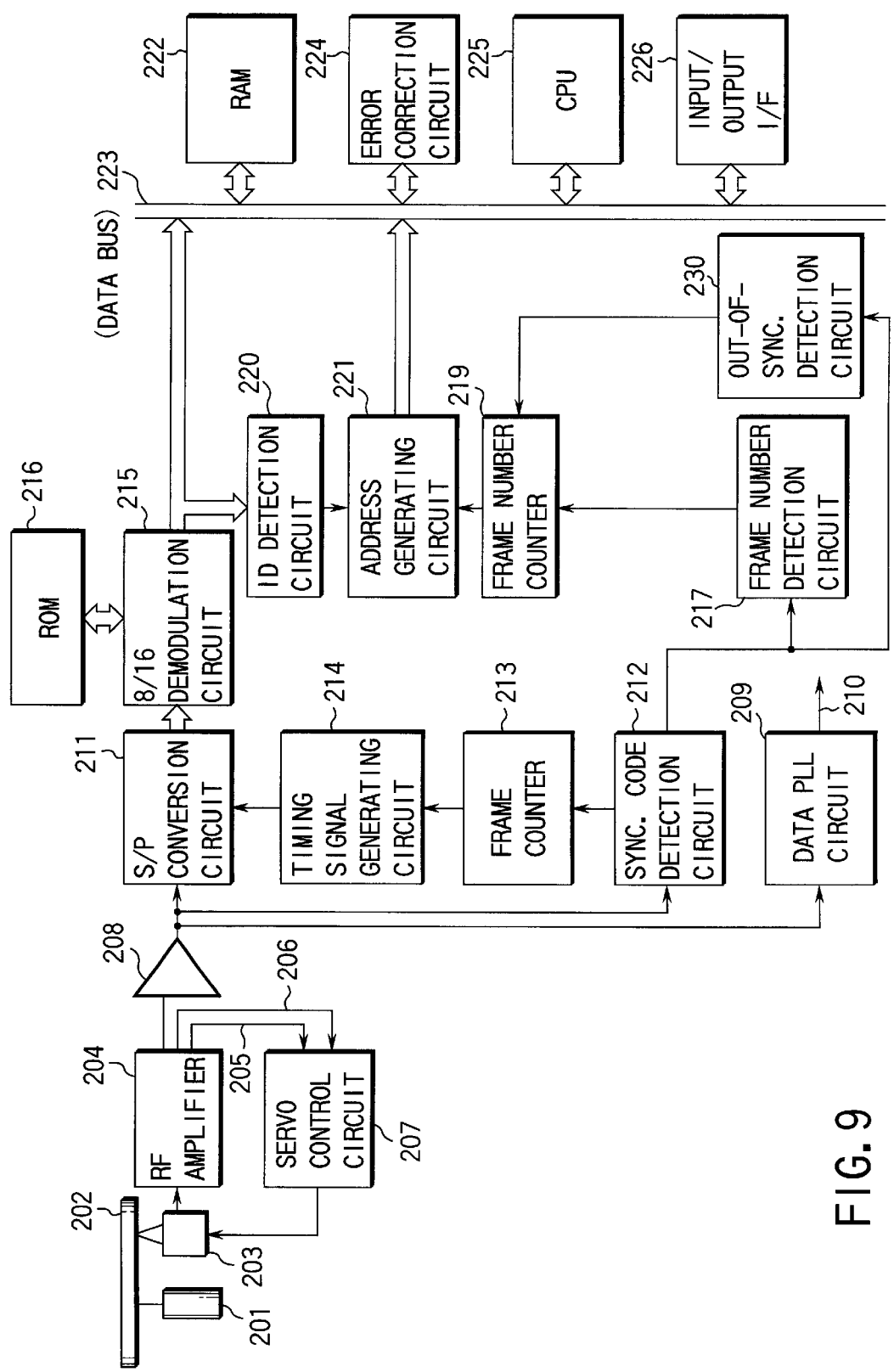
FIG. 9 is a construction diagram showing an optical disk apparatus relating to this invention.

An error correction circuit 124 corrects data stored into the RAM 122 in the unit of inner parity PI and outer parity PO shown in FIG. 6. That is, the error correcting operation is effected in the unit of two frames. A CPU 125 controls the operation of the whole portion of the optical disk apparatus. An input/output I/F circuit 126 controls the input/output of data between the RAM 122 and an external device (not shown).

An out-of-sync. detection circuit 130 detects the periodicity of the sync. codes supplied from the sync. code detection circuit 112 for each frame, for example, and outputs an out-of-sync. signal of high level, for example, if the periodicity of the sync. codes is disturbed. Therefore, the out-of-sync. signal is output in the unit of one frame as shown in FIG. 2. The out-of-sync. signal is supplied to a correction signal generating circuit 118 which is constructed by a logic circuit such as an AND circuit together with the least significant bit (LSB) of the frame number output from the frame number detection circuit 117. Since the lest significant bit is alternately and repeatedly set to "0" and "1" in response to the frame number sequentially supplied, it is set to the high level, for example, for every two frames. Therefore, as shown in FIG. 2, the correction signal generating circuit 118 constructed by the AND circuit generates a control signal for correcting the frame number counter 119 in the unit of two frames. The frame number counter 119 fetches and corrects the frame number from the frame number detection circuit 117 in the unit of two frames according to a control signal supplied from the correction signal generating circuit 118.

According to the above embodiment, as shown in FIG. 2, the correction signal generating circuit 118 generates a control signal used for correcting the frame number counter 119 in the unit of two frames according to an out-of-sync. signal output from the out-of-sync. detection circuit 130 and the least significant bit of the frame number output from the frame number detection circuit 117 and the frame number counter 119 corrects the frame number in the unit of two frames in response to the control signal. Therefore, since the continuity of two frames constituting one row of ECC block can be maintained, the correlation between the two frames can be maintained. Thus, since the error correction circuit 124 does not effect the correction process for the two frames of different inner parities PI in the error correction process using the inner parity PI, a lowering in the correction ability can be prevented.

Further, the correction signal generating circuit 118 is not limited to an AND circuit and can be constructed by another logic circuit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical signal processing circuit comprising:
   a sync. code detection circuit for detecting sync. codes included in a recording sector of an optical disk, said sector including a plurality of frames and each of the frames including a sync. code and data;

a frame number detection circuit for detecting a frame number of the frame based on the sync. code output from said sync. code detection circuit;

a frame number counter for counting the frame number output from said frame number detection circuit;

an out-of-sync. detection circuit for detecting the periodicity of the sync. codes output from said sync. code detection circuit and outputting an out-of-sync. signal when the periodicity is disturbed; and a frame number correction signal generating circuit for generating a control signal for correcting the frame number of said frame number counter in an error correction unit based on the out-of-sync. signal output from said out-of-sync. detection circuit and an output signal of said frame number detection circuit and supplying the control signal to said frame number counter.

2. A circuit according to claim 1, wherein said frame number correction signal generating circuit is a logic circuit for generating a control signal for correcting the frame number of said frame number counter in the error correction unit based on the outof-sync. signal output from said out-of-sync. detection circuit and the output signal of said frame number detection circuit.

3. A circuit according to claim 2, wherein the error correction unit is the unit of two frames of the sector.

4. A circuit according to claim 2, wherein said logic circuit is an AND circuit.

5. A circuit according to claim 1, wherein said frame number correction signal generating circuit generates a control signal for correcting the frame number of said frame number counter in the unit of two frames based on the out-of-sync. signal output from said out-of-sync. detection circuit and the least significant bit of the frame number output from said frame number detection circuit.

6. A circuit according to claim 5, wherein said out-of-sync. detection circuit outputs the out-of-sync. signal in units of one frame.

7. A circuit according to claim 5, wherein said frame number counter corrects the frame number in units of two frames in accordance with the control signal supplied from said frame number correction signal generating circuit.

8. A circuit according to claim 5, further comprising an error correction circuit for correcting an error in the data read out from the optical disk and demodulated, said error correction circuit correcting the error in the unit of two frames.

9. An optical disk apparatus comprising:

a reading circuit for reading a sync. code and data recorded in each of sectors of an optical disk;

a sync. code detection circuit for detecting the sync. code read by said reading circuit;

a frame number detection circuit for detecting a frame number of a frame included in the sector based on a plurality of sync. codes output from said sync. code detection circuit;

a frame number counter for counting the frame number according to an output signal of said frame number detection circuit;

an out-of-sync. detection circuit connected to said sync. code detection circuit, said out-of-sync. detection circuit outputting an out-of-sync. signal when the periodicity of the sync. codes output from said sync. code detection circuit is disturbed; and a frame number correction signal generating circuit connected to said out-of-sync. detection circuit and frame number detection circuit, said frame number correction signal generating circuit generating a control signal for correcting the frame number of said frame number counter in an error correction unit based on the out-of-sync. signal output from said out-of-sync. detection circuit and the output signal of said frame number detection circuit and supplying the control signal to said frame number counter.

10. An apparatus according to claim 9, wherein said frame number correction signal generating circuit is a logic circuit for generating a control signal for correcting the frame number of said frame number counter in the error correction unit based on the out-of-sync. signal output from said out-of-sync. detection circuit and the output signal of said frame number detection circuit.

11. An apparatus according to claim 10, wherein the error correction unit is the unit of two frames of the sector.

12. An apparatus according to claim 10, wherein said logic circuit is an AND circuit.

13. An apparatus according to claim 9, wherein said frame number correction signal generating circuit generates a control signal for correcting the frame number of said frame number counter in the unit of two frames based on the out-of-sync. signal output from said out-of-sync. detection circuit and the least significant bit of the frame number output from said frame number detection circuit.

14. An apparatus according to claim 13, wherein said out-of-sync. detection circuit outputs the out-of-sync. signal in the unit of one frame.

15. An apparatus according to claim 13, wherein said frame number counter corrects the frame number in the unit of two frames according to the control signal output from said frame number correction signal generating circuit.

16. An apparatus according to claim 9, further comprising a demodulating circuit for demodulating data read by said reading circuit; and an error correction circuit for correcting an error in the data demodulated by said demodulating circuit, said error correction circuit correcting the error in the unit of two frames.

17. An error correction method in an optical disk having a plurality of sectors each including a plurality of frames each of which includes a sync. code and data, comprising the steps of:

detecting the sync. code recorded in the sector of the optical disk;

detecting a frame number of the frame based on a plurality of sync. codes detected;

counting the frame number detected;

outputting an out-of-sync. signal when the periodicity of the detected sync. codes is disturbed; and correcting the counted frame number in an error correction unit based on the out-of-sync. signal and the frame number.

18. A method according to claim 17, wherein said step of correcting the frame number corrects the counted frame number in the error correction unit based on the out-of-sync. signal and a least significant bit of the detected frame number.

19. A method according to claim 18, wherein the error correction unit is the unit of two frames of the sector.

20. A method according to claim 17, further comprising a step of correcting the error in data read from the optical disk, by using inner parities and outer parities.

* * * * *